United States Patent [19]

Peter et al.

[11] Patent Number: 4,750,463
[45] Date of Patent: Jun. 14, 1988

[54] FUEL INJECTION SYSTEM FOR AN AIR-COMPRESSION INTERNAL-COMBUSTION ENGINE WITH ELECTRONIC REGULATION

[75] Inventors: Wolfgang Peter, Kornwestheim; Frank Thoma, Stuttgart, both of Fed. Rep. of Germany

[73] Assignee: Daimler-Benz Aktiengesellschaft, Stuttgart, Fed. Rep. of Germany

[21] Appl. No.: 4,903

[22] Filed: Jan. 20, 1987

[30] Foreign Application Priority Data

Jan. 23, 1986 [DE] Fed. Rep. of Germany ....... 3601881

[51] Int. Cl.⁴ ............................................. F20M 59/20
[52] U.S. Cl. .................................. 123/479; 123/198 D; 123/365; 123/374
[58] Field of Search .................... 123/479, 374, 198 D

[56] References Cited

U.S. PATENT DOCUMENTS 4,252,089 2/1981 Kramer ............................. 123/374
4,534,328 8/1985 Fischer et al. ..................... 123/479

FOREIGN PATENT DOCUMENTS 3130080 2/1983 Fed. Rep. of Germany.
3235345 3/1984 Fed. Rep. of Germany.

OTHER PUBLICATIONS

Elekstronische Dieselregelung EDR fur Nutzfahrzeuge, ATZ Automobiltechnische Zeitschrift 85, 1983, pp. 539–548 (some translation).

Primary Examiner—Albert W. Davis, Jr.
Attorney, Agent, or Firm—Barnes & Thornburg

[57] ABSTRACT

An electronically regulated fuel injection system for an internal combustion engine with a switchable safety and emergency driving device has a mechanical coupling which mechanically couples the accelerator pedal to the regulator. This coupling operatively interferes with a mechanical connection between a controller and the final control element that determines the quantity of fuel to be injected, after a fault signal has been outputted by a signal processing unit to a switchover element, which switches over control of the final control element to the simple regulator.

3 Claims, 1 Drawing Sheet

FUEL INJECTION SYSTEM FOR AN AIR-COMPRESSION INTERNAL-COMBUSTION ENGINE WITH ELECTRONIC REGULATION

BACKGROUND AND SUMMARY OF THE INVENTION

The invention relates to a fuel injection system for an air-compression internal-combustion engine with electronic regulation having a signal processing unit to which signals of an accelerator pedal position sensor are fed, and a controller to adjust the position of a final control element of an injection pump. A simple regulator is connected permanently to the accelerator pedal and a switchover element which switches control of the final control element to the simple regulator.

Fully electronic regulation systems, which are known for regulating internal-combustion engines, particularly for motor cars, allow universal programmability and a large number of possible functions. However, these functions either cannot be realized, or can be realized only incompletely or through great expense, with the existing mechanical, pneumatic or hydraulic systems.

It is considered a disadvantage of the fully electronic regulation systems that, in the case of a failure of one or more electronic components, the connection between the accelerator pedal and the final control element on the engine which determines the torque is disturbed. Safety and emergency driving devices which are superimposed on the electronic regulation system to remedy this disadvantage are known. For example, emergency driving operation is possible by a control device shown in German Unexamined Published Patent Application No. 3,235,345. In that device, in the case of a failure of the regulation path sensor, the driver is able to exert an influence upon the power output of the internal-combustion engine. Due to the selector switches included in this system downstream of the signal processing unit and of the control regulator, when there is a fault, a modified signal line is formed. The signal processing unit is replaced as the connecting member between the accelerator pedal position sensor and control regulator, by a periodic voltage transformer. It is also possible to include a proportional regulator in the signal path instead of the control regulator.

It is an objective of the present invention to provide an electronically regulated fuel injection system with a switchable safety and emergency driving device, which by simple switchover, ensures a connection independent of the electronic system between the accelerator pedal and the final control element on the injection pump which determines the quantity of fuel when a fault condition exists in the electronic regulation.

This and other objects are achieved in the present invention by providing in an electronically regulated fuel injection system with a switchable safety and emergency driving device, a mechanical coupling which mechanically couples the accelerator pedal to the regulator. The mechanical coupling operatively interferes with a mechanical connection, between the controller and a final control element which determines the quantity of fuel to be injected, after a fault signal is outputted by a signal processing unit to the switchover element.

An advantage provided by the present invention is that after a fault signal from the signal processing unit of the fully electronic fuel injection system, or when there is a voltage drop for other reasons, a switchover element brings the mechanically simple regulator into engagement. Due to the construction of the kinematics, the position of the electrical controller no longer has any influence on the final control element of the injection pump which determines the fuel quantity. The switchover is designed so that whichever system is not switched in to influence the final control element continues to run idly, so as not to influence the switched-in system. A regulator which is intended solely for emergency operation driving service, with a no-load characteristic, but without special measures to stabilize the no-load characteristic, and a simplified full-load characteristic (only with final downward regulation) is used as a simple regulator.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
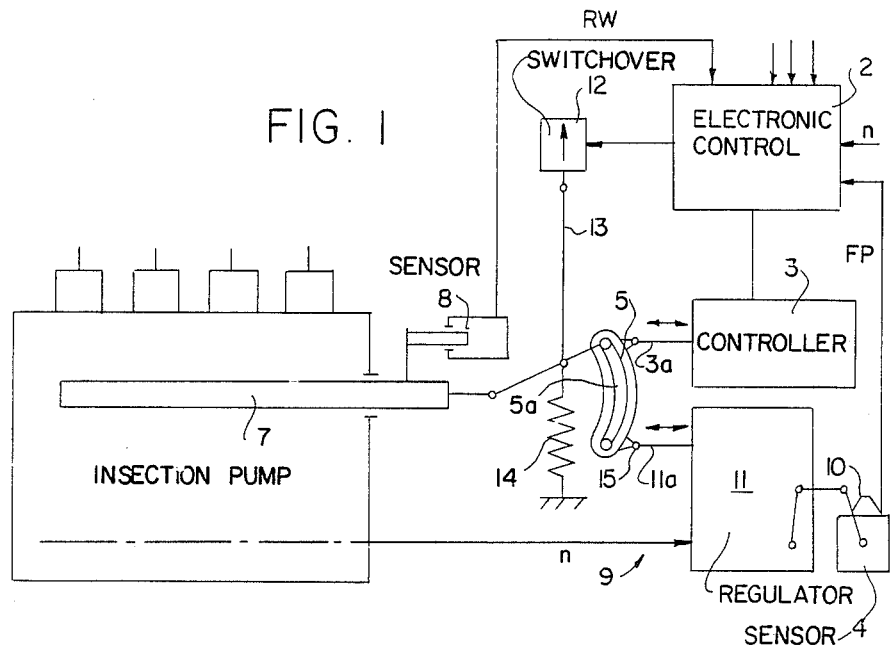
FIG. 1 is a block, partially schematic diagram of a preferred embodiment of the present invention.

In the fuel injection system for a diesel internal-combustion engine shown in FIG. 1, an injection pump is designated 1, a signal processing unit as electronic control device 2, and a controller 3 modulable by the control unit.

Signals representative of the instantaneous accelerator pedal position are fed by means of an accelerator pedal position sensor 4 to the control device 2. These pedal position signals are converted with further signals into an output signal intended for the controller 3. These further signals are, for example, representative signals for the engine speed, the intake temperature, cooling water temperature and fuel temperature.

The controller 3 has a control arm 3a slidable inwards or outwards in the direction of the arrows. This control arm 3a is articulatingly connected to the upper end of a cam piece 5 which is directly connected articulatively via a connecting rod 6 to a final control member 7 which determines the quantity of fuel. The final control element 7 is the regulating rod on the injection pump 1. A regulation path signal of the regulating rod 7 is fed back to the control device 2 by means of a regulation path sensor 8.

In order to counteract dangers which are possible during driving operation where there is a fault in the electronic system, the fuel injection system is equipped with a safety and emergency driving device 9. It essentially comprises a simple regulator 11 coupled mechanically to the accelerator pedal 10, and a switchover element 12 which in preferred embodiments is a solenoid that opens after receipt of a fault signal from the control device 2. The switchover element 12, by its actuating rod 13, causes the mechanically simple regulator 11 to control the regulating rod 7 without any further influence of the electrical control 3 upon the regulating rod 7.

Figure 2:
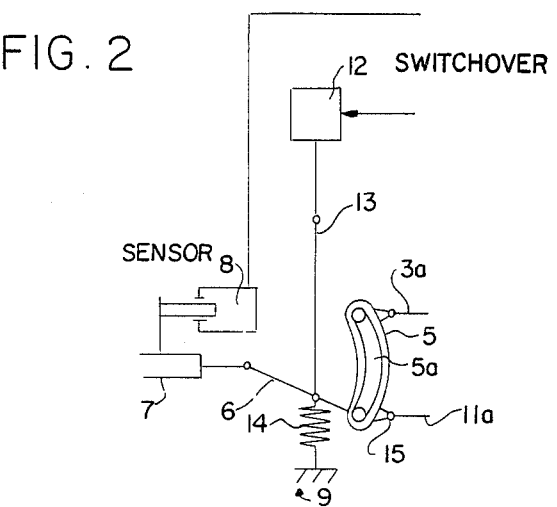
FIG. 2 shows a part of the embodiment of FIG. 1.

During the switchover process the switchover linkage (actuating rod 13 and connecting rod 6), which was maintained by the solenoid 12 counter to the force of a spring 14, is moved into a lower position by the spring 14 when the solenoid 12 opens, as seen in FIG. 2. The connecting rod 6 is thereby pivoted downwards in a cullis 5a of the cam piece 5. A mechanical connection operative for emergency driving service is produced from the accelerator pedal 10 via the regulator 11, the regulator arm 11a being articulately connected to the lower end of the cam piece 5, and the connecting rod 6 to the regulating rod 7.

When the injection system is switched over to normal service, the safety and emergency driving device 9 is idle through a displacement of the pivot axis of the cam piece 5.

Embodiments using corresponding pneumatic or hydraulic regulators are also contemplated instead of a mechanically simple regulator.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Fuel injection system for an air-compression internal-combustion engine with electronic regulation, having a signal processing unit to which signals of an accelerator pedal position sensor are fed, and a controller connected to the signal processing unit to adjust positioning of a final control element of an injection pump which determines a quantity of fuel injected and, simple regulator means connected permanently to the accelerator pedal and a switchover element for switching control of the final control element to the simple regulator means as part of a safety and emergency driving device, the improvement comprising:

mechanical coupling means for mechanically coupling said accelerator pedal to the final control element and for operatively interferring with a mechanical connection between the controller and the final control element after a fault signal is outputted by the signal processing unit to the switchover element, wherein said mechanical connection comprises a connecting rod articulated to the final control member and a cam piece provided as a guide means for changing the position of the connecting rod, one end of said cam piece being pivotably mounted on a control arm of the controller and its other end on a regulator arm of the simple regulator means, with said switchover element engaging and determining the position of the connecting rod in the cam piece.

2. Fuel injection system according to claim 1, wherein the switchover element is a solenoid with an actuating rod connected to said connecting rod, said switchover element maintaining, counter to a spring, the connecting rod in a position in said cam piece allowing for the electronic regulation of the fuel injection quantity; said connecting rod being transferable by said switchover element into a position in said cam piece for producing only mechanical regulation when the solenoid is modulated after the fault signal is received by the switchover element.

3. Fuel injection system according claim 2, wherein the cam piece has a cullis for the connecting rod extending virtually along the total length of the cullis to accomodate changes in the position of said connecting rod.

* * * * *